(12) United States Patent
Johansson et al.

(10) Patent No.: US 9,489,096 B2
(45) Date of Patent: Nov. 8, 2016

(54) TOUCH SCREEN TOUCH FORCE MEASUREMENT BASED ON FINGER DEFORMATION SPEED

(71) Applicant: Sony Corporation, Tokyo (JP)

(72) Inventors: Fredrik Johansson, Malmö (SE); Magnus Midholt, Lund (SE); Ola Thörn, Limhamn (SE); Magnus Landqvist, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 34 days.

(21) Appl. No.: 14/580,751

(22) Filed: Dec. 23, 2014

(65) Prior Publication Data

US 2016/0179245 A1 Jun. 23, 2016

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01)

(58) Field of Classification Search
CPC .... G06F 3/0414; G06F 3/0416; G06F 3/044; G06F 3/03547; G06F 3/0488; G06K 9/0002
USPC ......................................................... 345/173
See application file for complete search history.

(56) References Cited

U.S. PATENT DOCUMENTS

| | | | | |
|---|---|---|---|---|
| 2011/0102340 A1* | 5/2011 | Martin | .................. | G06F 1/1662 345/173 |
| 2011/0304567 A1* | 12/2011 | Yamamoto | ............ | G06F 3/0416 345/173 |
| 2013/0063386 A1 | 3/2013 | Kojima et al. | | |
| 2014/0009430 A1 | 1/2014 | Italia et al. | | |
| 2014/0354585 A1 | 12/2014 | Cok et al. | | |
| 2014/0362013 A1 | 12/2014 | Nikoozadeh et al. | | |

OTHER PUBLICATIONS

Yuriko et al., "Detection of tangential force for a touch panel using shear deformation of the gel", Apr. 26, 2014, pp. 2353-2358.
International Search Report and Written Opinion for International Application No. PCT/US2015/035064 dated Sep. 7, 2015.
Pedersen, E. W. and Hornbaek, K.: "Expressive Touch: Studying Tapping Force on Tabletops." Proceedings of the SIGCHI Conference on Human Factors in Computing Systems—CHI 2014, One of a CHInd, Toronto, ON, Canada, Apr. 26-May 1, 2014, 10 pages.
Kim, Hong-Ki, et al.: "Transparent and Flexible Tactile Sensor for Multi-Touch Screen Application with Force Sensing." Solid-State Sensors, Actuators and Microsystems Conference, 2009. Transducers 2009, Jun. 21-25, 2009, 4 pages.

* cited by examiner

*Primary Examiner* — Viet Pham
(74) *Attorney, Agent, or Firm* — Tucker Ellis LLP (57) ABSTRACT

A device includes a capacitive sampling unit that measures, at the multiple instances of time during a touch interval, capacitance values of a capacitive touch screen display associated with an area in contact with a finger touching the capacitive touch screen display. The device further includes a touch deformation area unit that determines, at the multiple instances of time, a size of the area upon the capacitive touch screen display in contact with the finger touching the capacitive touch screen display. The device also includes a touch force estimation unit that determines a rate of change in the size of the area in contact with the finger, and estimates a touching force of the finger touching the capacitive touch screen display based on the determined rate of change in the size of the area.

11 Claims, 10 Drawing Sheets

TOUCH SCREEN TOUCH FORCE MEASUREMENT BASED ON FINGER DEFORMATION SPEED

BACKGROUND

Many different types of consumer electronics devices nowadays typically include a touch screen that may act as an output device that displays image, video and/or graphical information, and which further may act as an input touch interface device for receiving touch control inputs from a user. A touch screen (or touch panel, or touch panel display) may detect the presence and location of a touch within the area of the display, where the touch may include a touching of the display with a body part (e.g., a finger) or with certain objects (e.g., a stylus). Touch screens typically enable the user to interact directly with what is being displayed, rather than indirectly with a cursor controlled by a mouse or touchpad. Touch screens have become widespread in use with various different types of consumer electronic devices, including, for example, cellular radiotelephones, personal digital assistants (PDAs), and hand-held gaming devices.

SUMMARY

In one exemplary embodiment, a method includes measuring, at multiple instances of time during a touch interval, capacitance values of a capacitive touch screen display associated with an area in contact with a finger touching the capacitive touch screen display; determining, at the multiple instances of time, a size of the area upon the capacitive touch screen display in contact with the finger touching the capacitive touch screen display; determining a rate of change in the size of the area in contact with the finger with respect to time; estimating a speed associated with the finger based on the determined rate of change in the size of the area; and estimating a touching force of the finger touching the capacitive touch screen display based on the estimated speed associated with the finger.

In another exemplary embodiment, a device includes a capacitive touch screen display; a capacitive sampling unit configured to measure, at the multiple instances of time during a touch interval, capacitance values of the capacitive touch screen display associated with an area in contact with an object touching the capacitive touch screen display; a touch deformation area unit configured to measure, at multiple instances of time, a size of the area upon the capacitive touch screen display in contact with the deformable pointing object touching the capacitive touch screen display; and a touch force estimation unit configured to: determine a rate of change in the size of the area in contact with the object with respect to time; and estimate a touching force of the object touching the capacitive touch screen display based on the determined rate of change of the size of the area with respect to time.

In yet another exemplary embodiment, a non-transitory computer-readable medium containing instructions executable by at least one processor includes one or more instructions for receiving first measurements, at multiple instances of time during a touch interval, of capacitance values of a capacitive touch screen display associated with an area in contact with a finger touching the capacitive touch screen display; one or more instructions for receiving second measurements, at the multiple instances of time, of a size of the area upon the capacitive touch screen display in contact with the finger touching the capacitive touch screen display; one or more instructions for determining a rate of change in the size of the area in contact with the finger with respect to time; and one or more instructions for estimating a touching force of the finger touching the capacitive touch screen display based on the determined rate of change in the size of the area with respect to time.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1A:
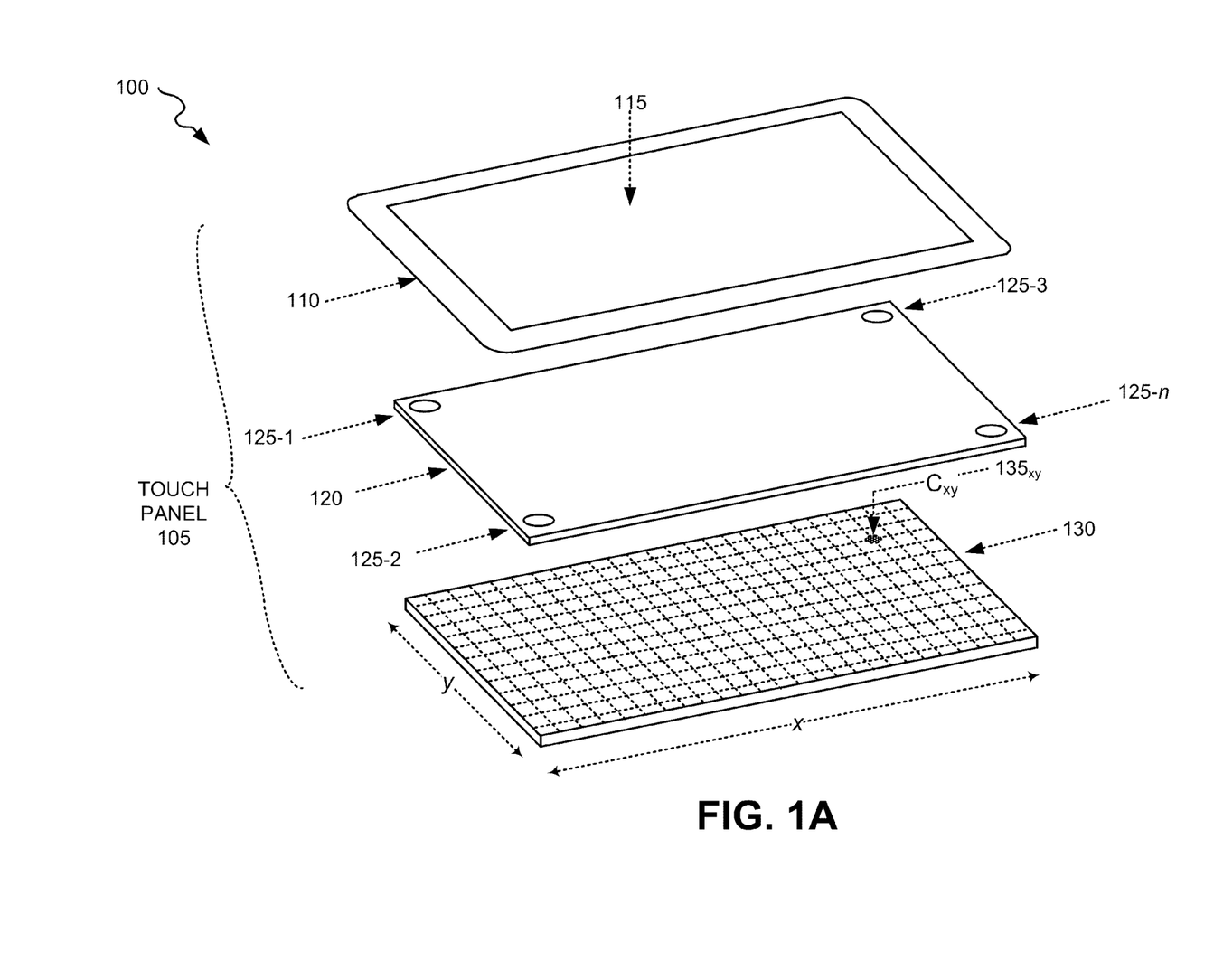
FIGS. 1A and 1B illustrate the use of a touch panel of a touch screen display of an electronic device for performing an accurate estimation of a touch force upon the touch panel based on a finger deformation speed.
Figure 1B:
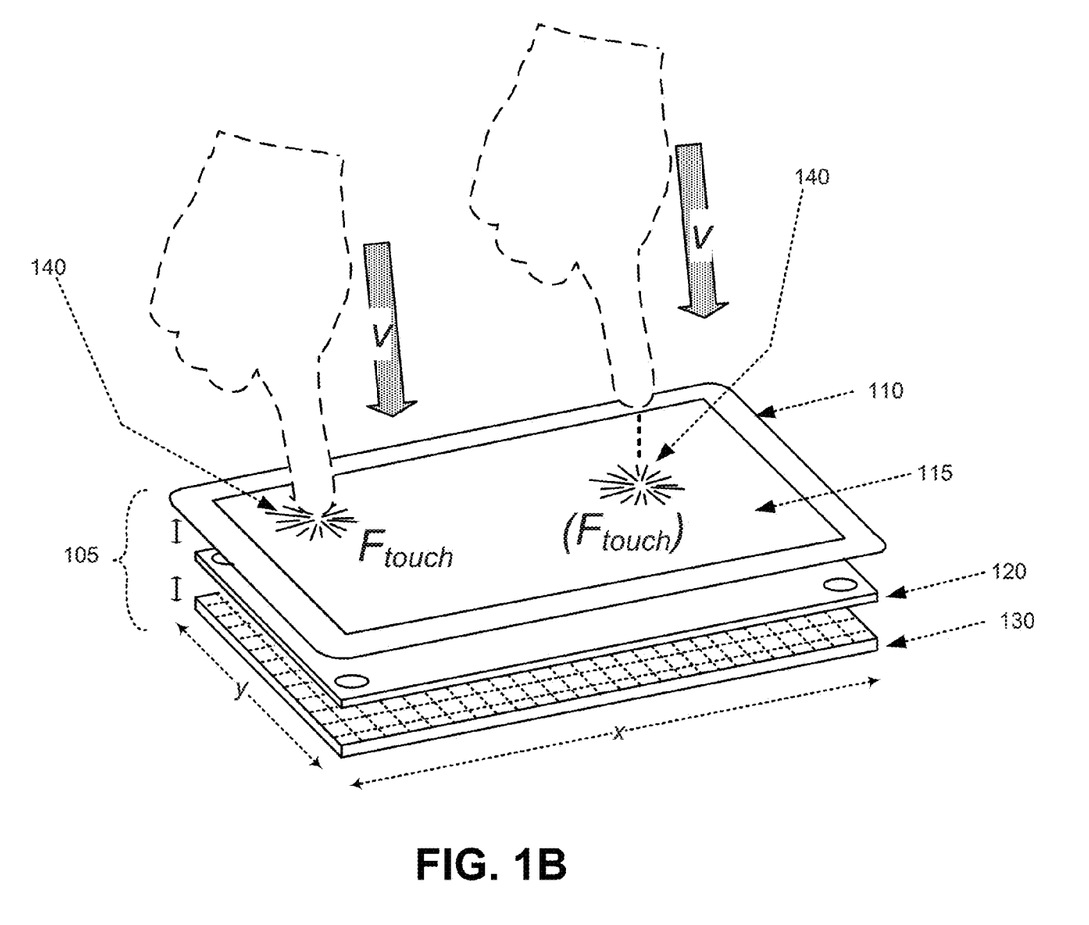

FIGS. 1A and 1B illustrate the use of a touch panel 105 of a touch screen display of an electronic device 100 for performing an accurate estimation of a touch force upon touch panel 105 based on a finger deformation speed. Touch panel 105, as depicted in FIGS. 1A and 1B, does not show other components of the touch screen display or device 100 for purposes of simplicity.

Electronic device 100 may include any type of electronic device that includes a touch screen display. For example, device 100 may include a cellular radiotelephone; a satellite navigation device; a smart phone; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a gaming device; a media player device; a tablet computer; a surface table with touch screen display; or a digital camera. In some exemplary embodiments, device 100 may include a handheld electronic device. In one implementation, device 100 may include a device having a projected display with, for example, a projected user interface.

Touch panel 105 may be integrated with, and/or overlaid on, a display to form a touch screen or a panel-enabled display that may function as a user input interface. For example, in one implementation, touch panel 105 may include a capacitive type of touch panel that allows a touch screen display to be used as an input device. The capacitive type of touch panel may include a self capacitance and/or mutual capacitance type of touch panel (e.g., a Floating Touch™ display using self capacitance and mutual capacitance). In other implementations, other types of near field-sensitive, acoustically-sensitive (e.g., surface acoustic wave), photo-sensitive (e.g., infrared), and/or any other type of touch panel may be used that allows a display to be used as an input device. In some implementations, touch panel 105 may include multiple touch-sensitive technologies. Generally, touch panel 105 may include any kind of technology that provides the ability to identify the occurrence of a touch upon touch panel 105.

The display (not shown) associated with touch panel 105 may include a device that can display signals generated by the electronic device 100 as text or images on a screen (e.g., a liquid crystal display (LCD), cathode ray tube (CRT) display, organic light-emitting diode (OLED) display, surface-conduction electro-emitter display (SED), plasma display, field emission display (FED), bistable display, etc.). In certain implementations, the display may provide a high-resolution, active-matrix presentation suitable for the wide variety of applications and features associated with typical devices. The display may provide visual information to the user and serve—in conjunction with touch panel 105—as a user interface to detect user input. The terms "touch" or "touch input," as used herein, may refer to a touch of an object upon touch panel 105, such as a body part (e.g., a finger) or a pointing device, or movement of an object (e.g., body part or pointing device) to within a certain proximity of touch panel 105.

In the exemplary implementation depicted in FIGS. 1A and 1B, touch panel 105 includes an external face 110 of electronic device 100 that includes a touch surface 115. As shown in the exploded view of FIG. 1A, touch panel 105 further includes an acoustic measuring layer 120 and a touch position measuring layer 130. Acoustic measuring layer 120 includes multiple acoustic sensors 125-1 through 125-n (where n is a positive integer greater than or equal to 2). In the implementation shown in FIG. 1A, four acoustic sensors are depicted, with one in each corner of touch panel 105. In other implementations, a different number of, and different configuration of, acoustic sensors 125-1 through 125-n may be used. In some implementations, acoustic sensors 125-1 through 125-n may each include an accelerometer or a microphone.

As further shown in FIG. 1A, touch position measuring layer 130 includes an array of position measuring sensors 135$_{xy}$ that measure a touch upon touch panel 105 at an x and y position within layer 130. In the implementation of FIGS. 1A and 1B, touch position measuring layer 130 includes an array of capacitive measuring sensors (e.g., an array of indium doped zinc oxide sensing unit cells) where the capacitance at each position x and y varies with the touch force applied at each position x and y. For example, as the touch force increases at an x and y position, capacitance may increase at that x and y position. The capacitance measuring sensors may include an array of projected capacitance sensors (i.e., self capacitance and/or mutual capacitance).

FIG. 1B depicts another exploded view of touch panel 105 where a touch 140 is occurring upon touch surface 115, with the object touching touch surface 115 having a velocity (v) and applying a force ($F_{touch}$) that varies with respect to time. In FIG. 1B, the object (on the left) touching touch surface 115, or the object moving within a certain proximity of touch surface 115 (on the right), is depicted as a finger. As further described with respect to FIG. 4 below, acoustic measurements are made during touch 140 using acoustic sensors 125 of layer 120, and capacitance measurements are made at one or more cells in the array of capacitive cells of layer 130. As described further herein, the acoustic measurements and capacitance measurements, made at multiple instances of time when touch 140 is occurring, may be used for performing an accurate estimation of $F_{touch}$ during an interval over which touch 140 occurs (i.e., the touch interval). As shown on the right in FIG. 1B, the capacitive sensor array of touch panel 105 may enable a "touch" to be detected when the object (e.g., finger) moves with a speed (v) within a certain proximity of touch panel 105. The speed v may be proportional to a "virtual" touching force (($F_{touch}$)) upon touch panel 105, even though no physical touch may actually occur.

Figure 2:
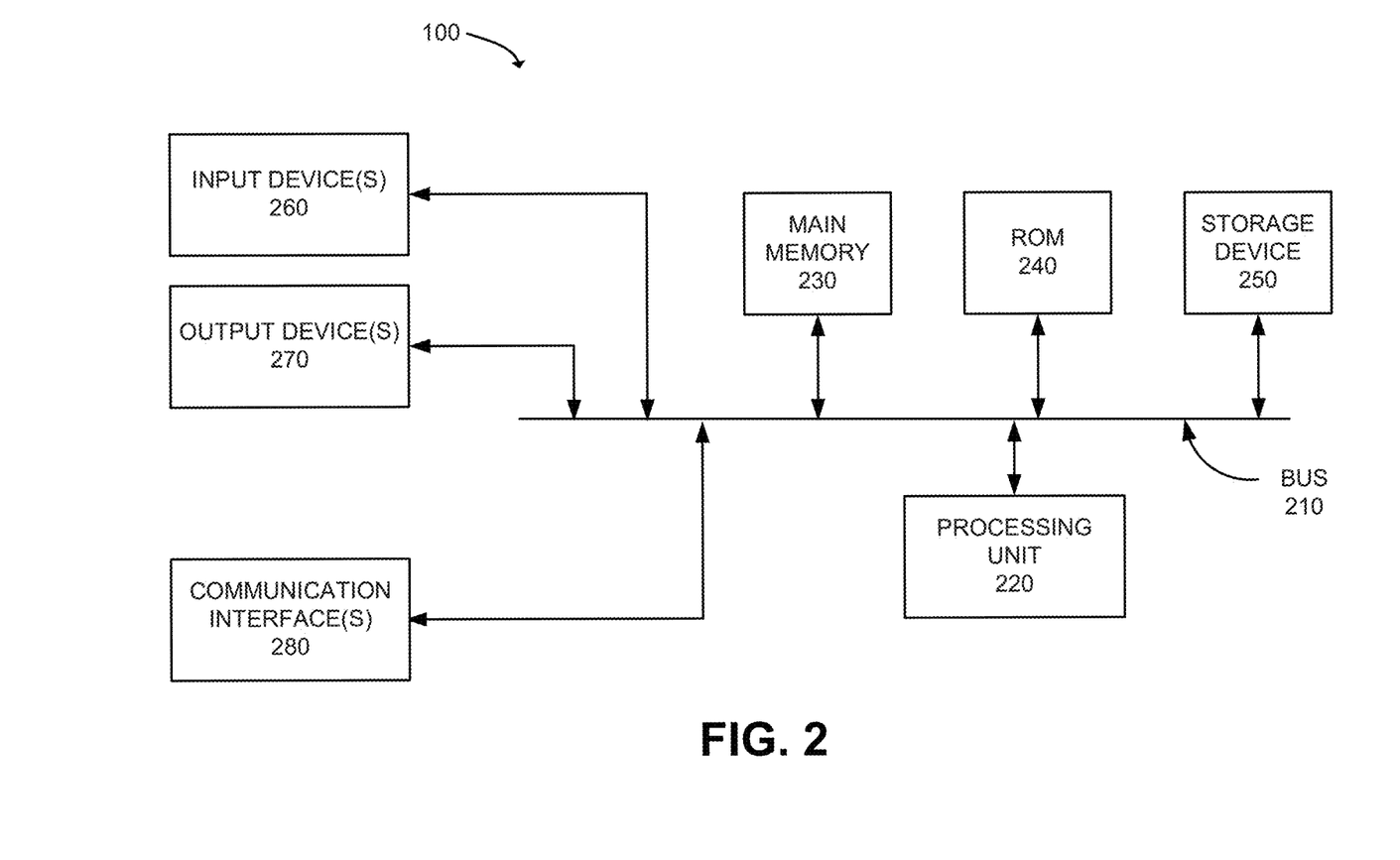
FIG. 2 is a block diagram that depicts exemplary components of the electronic device of FIG. 1A.
Figure 3:
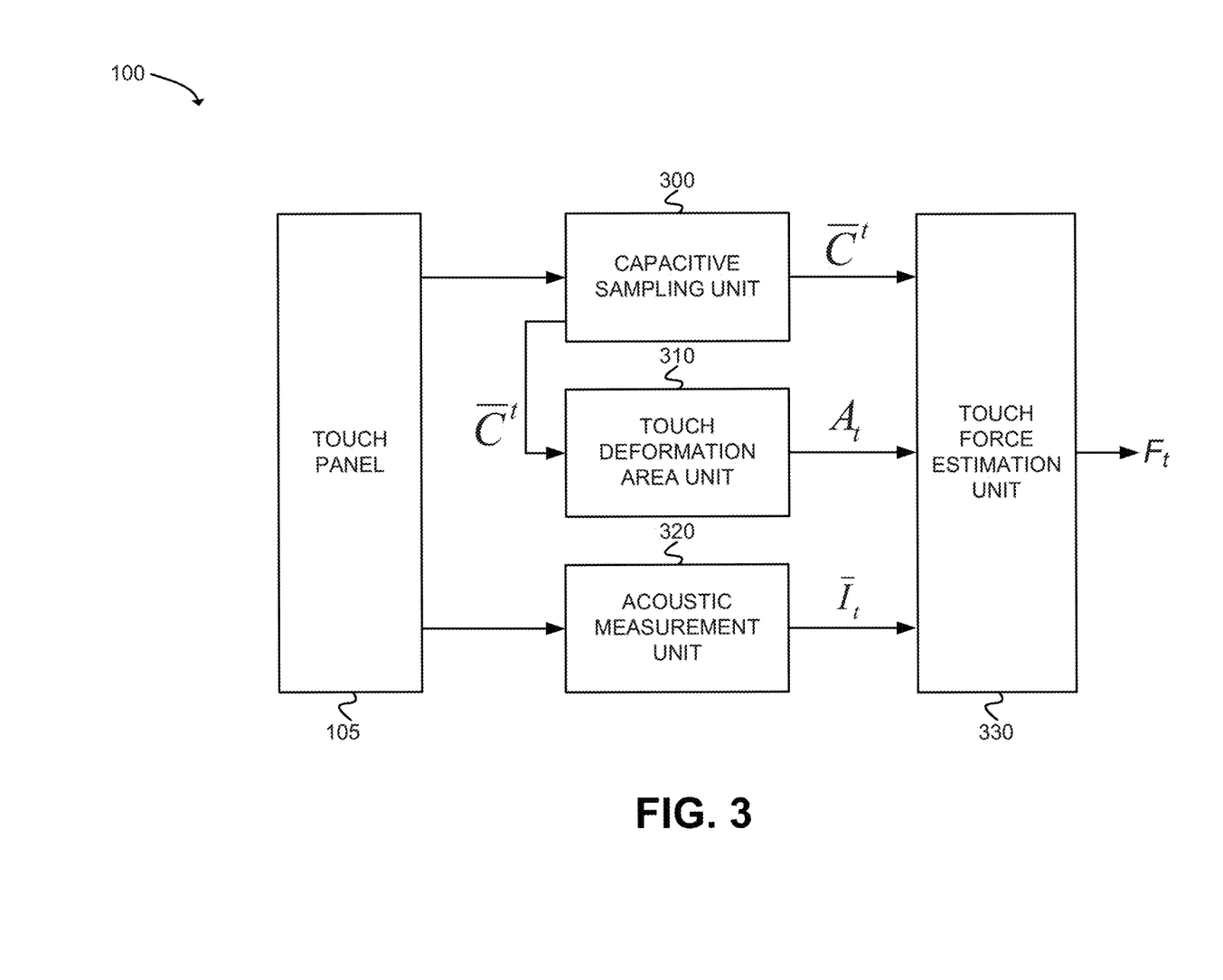
FIG. 3 depicts exemplary functional components of the electronic device of FIG. 1A.

FIG. 2 is a block diagram that depicts exemplary components of electronic device 100. As illustrated, electronic device 100 may include a bus 210, a processing unit 220, a main memory 230, a read only memory (ROM) 240, a storage device 250, an input device(s) 260, an output device(s) 270, and a communication interface(s) 280. Bus 210 may include a path that permits communication among the elements of device 100. Device 100 may include circuitry, not shown in FIG. 2, that is depicted in FIG. 3 below.

Processing unit 220 may include a processor, microprocessor, or processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium and its corresponding drive. Main memory 230, ROM 240 and storage device 250 may each be referred to herein as a "tangible non-transitory computer-readable medium."

Input device 260 may include a mechanism that permits a user to input information to device 100, such as a mouse, a pen, voice recognition and/or biometric mechanisms, etc. Input device 260 may further include a touch screen display that includes touch panel 105. Output device 270 may include a mechanism that outputs information to the operator, including a display, a printer, a speaker, etc. Output device 270 may additionally include the touch screen display that also acts as an input device 260. Communication interface 280 may include any transceiver-like mechanism that enables device 100 to communicate with other devices and/or systems.

Device 100 may perform certain operations or processes described herein. Device 100 may perform these operations in response to processing unit 220 executing software instructions contained in a computer-readable medium, such as memory 230. A computer-readable medium may be defined as a physical or logical memory device. The software instructions may be read into memory 230 from another computer-readable medium, such as data storage device 250, or from another device via communication interface 280. The software instructions contained in memory 230 may cause processing unit 220 to perform operations or processes described herein. Alternatively, hardwired circuitry may be used in place of or in combination with software instructions to implement processes described herein. Thus, implementations described herein are not limited to any specific combination of hardware circuitry and software.

The configuration of components of device 100 illustrated in FIG. 2 is for illustrative purposes only. Other configurations may be implemented. Therefore, device 100 may include additional, fewer and/or different components, or differently arranged components, from those depicted in FIG. 2.

Figure 4:
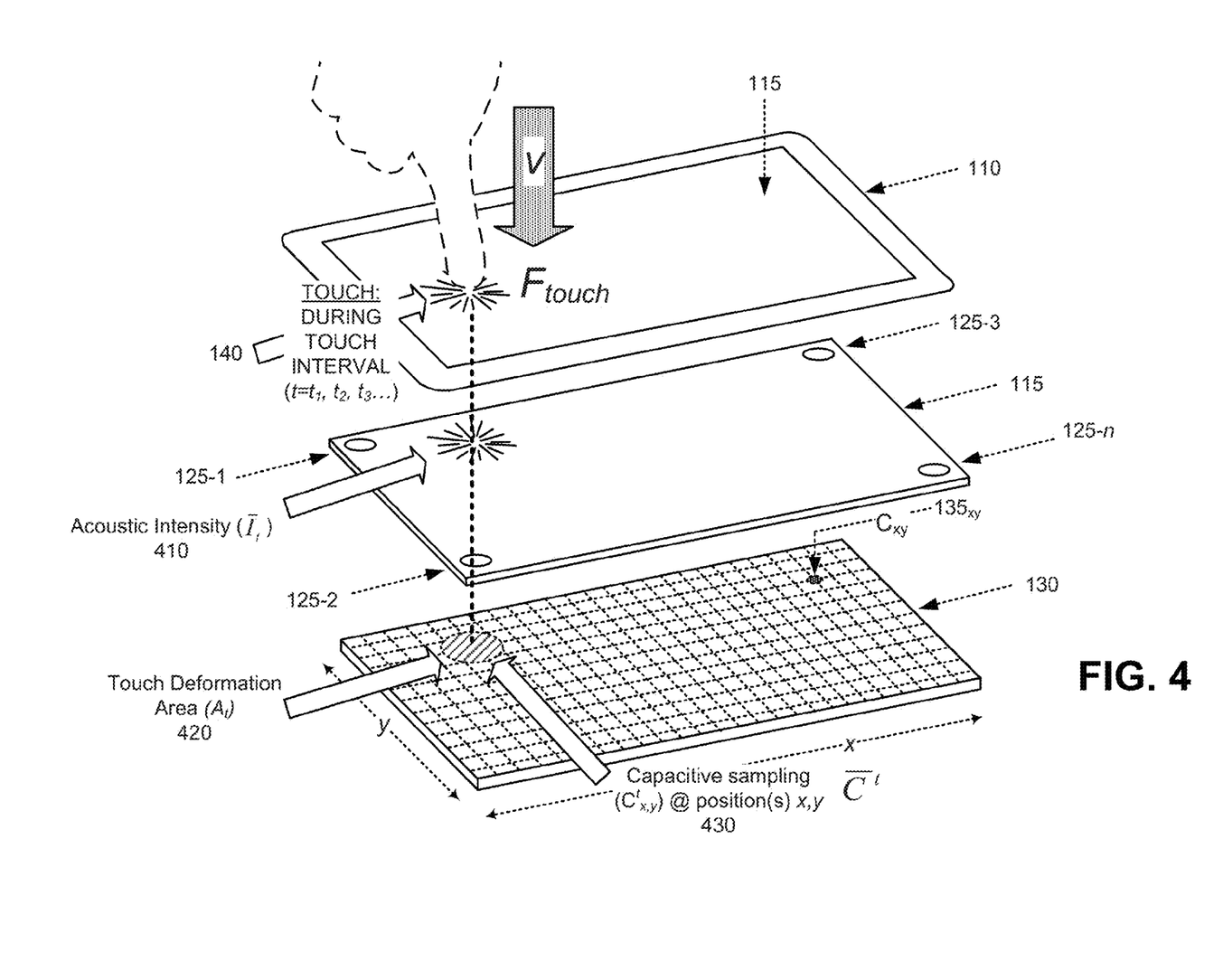
FIG. 4 depicts a touch occurring upon a touch surface of the touch panel of FIG. 1A at a time t, with the object applying the touch moving at a speed v with respect to the touch surface.

FIG. 3 depicts exemplary functional components of electronic device 100. The functional components of device 100 depicted in FIG. 3 may be implemented using special purpose circuitry in conjunction with hardware or software executed processes. As shown in FIG. 3, device 100 may include touch panel 105, a capacitive sampling unit 300, a touch deformation area unit 310, an acoustic measurement unit 320, and a touch force estimation unit 330. The operation of the functional components of FIG. 3 is described below with reference to FIG. 4. Referring to FIG. 4, touch 140 occurs upon, or within a proximity of, touch surface 115 of touch panel 105 during a touch interval ($t=t_1$, $t_2$, $t_3$, ...), with the object associated with touch 140 moving at a speed v with respect to touch surface 115. Touch 140 applies a force $F_{touch}$ to touch surface 115 during the touch interval with a specific magnitude that is based on the speed (v) of the object.

Capacitive sampling unit 300 samples a measurement of a capacitance value $C_{xy}$ at each cell location x, y in the array of capacitive cells in touch position measuring layer 130 at successive sampling time instances $t_1$, $t_2$, $t_3$, ... $t_q$ during the touch interval. Capacitive sampling unit 300 generates a vector output $\overline{C}^t$ that includes a vector array of capacitance values for each cell location x, y in touch position measuring layer 130 at each time instance t during the touch interval. Unit 300 provides the vector output $\overline{C}^t$ to touch deformation unit 310 and to touch force estimation unit 330.

Touch deformation area unit 310 receives the vector output $\overline{C}^t$ of capacitance values from capacitive sampling unit 300 and based on the measured array of capacitance values, determines, as shown in FIG. 4, a touch deformation area $A_{t_x}$ 420 associated with touch 140 upon touch surface 115. For example, out of the entire array of capacitance values, several capacitance values in a region of touch position measuring layer 130 may exceed a threshold capacitance value indicating a touch in that region, where the touch deformation area $A_{t_x}$ is defined by the region having capacitance values exceeding the threshold capacitance value. The size and location of the touch deformation area $A_{t_x}$ at time instance t during the touch interval may be supplied to touch force estimation unit 330.

Acoustic measurement unit 320 may measure an acoustic intensity $I_t$ at each time instance t at each acoustic sensor 125-1 through 125-n to generate an acoustic intensity vector $\overline{I}_t$ 410, as shown in FIG. 4, that includes n different acoustic intensity values. Acoustic measurement unit 320 supplies acoustic intensity vector $\overline{I}_t$ to touch force estimation unit 330. The value of the acoustic intensity at each sensor 125 is dependent on time, since the sound waves need to travel from the touch location upon touch panel 105 to each of acoustic sensors 125-1 through 125-n.

Figure 8A:
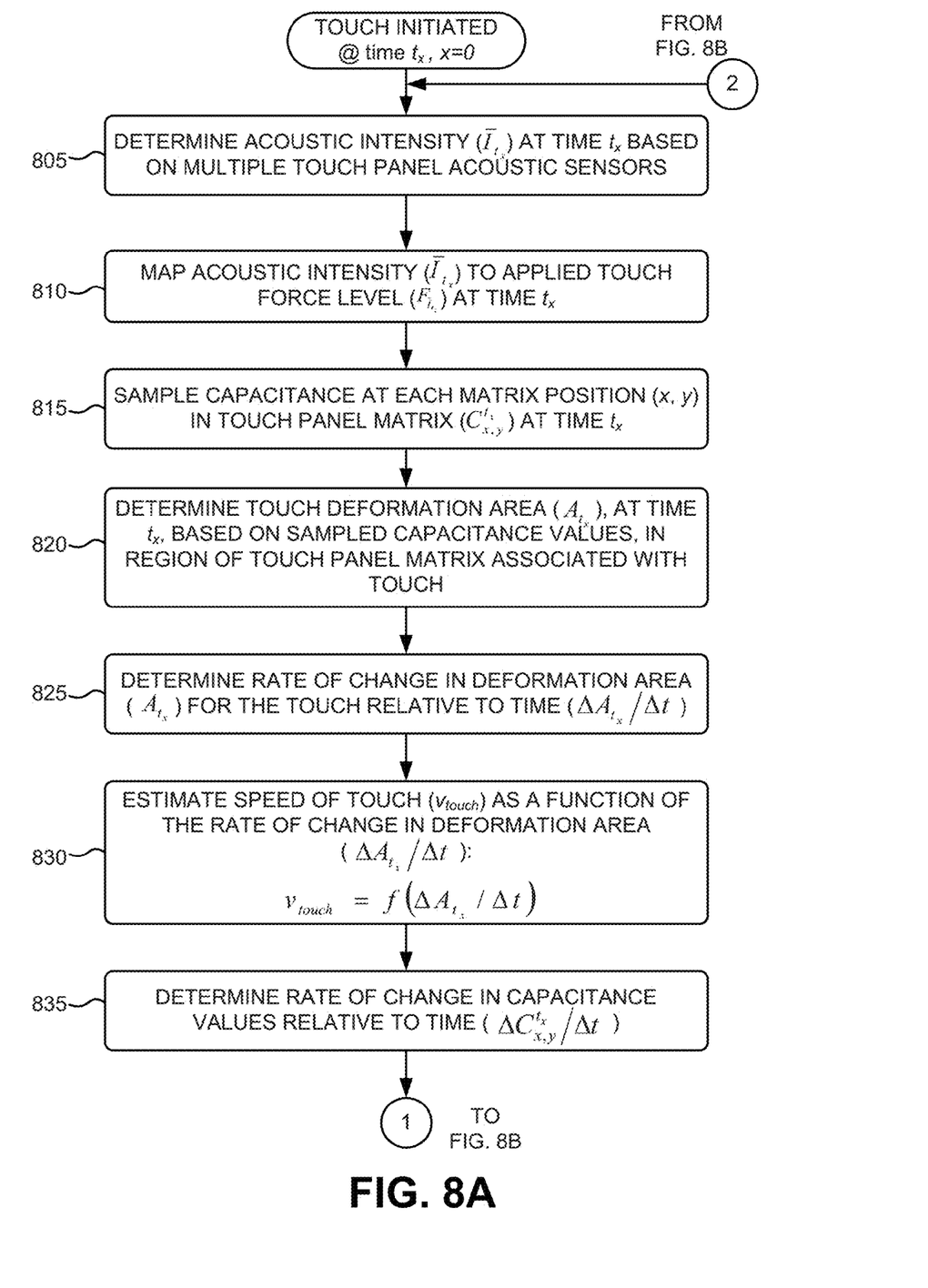
FIGS. 8A and 8B are flow diagrams illustrating an exemplary process for estimating a force of a touch upon a touch surface of a touch screen display based on corresponding acoustic intensity measurements and an estimated speed of an object associated with the touch.
Figure 8B:
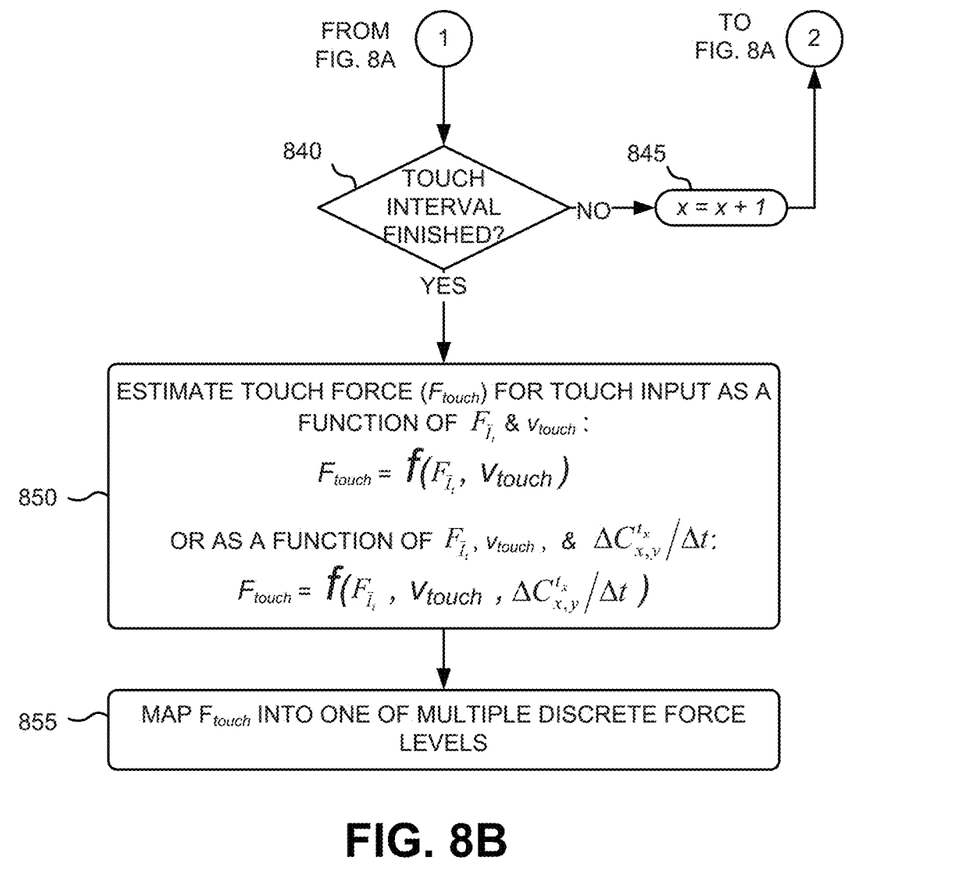

Touch force estimation unit 330 receives, at each time instance $t_x$ during the touch interval, the vector array of capacitance values $\overline{C}^t$, the touch deformation area $A_{t_x}$, and the acoustic intensity vector $\overline{I}_t$ from units 300, 310 and 320, respectively, and stores the values in memory (e.g., memory 230, ROM 240 or storage device 250). Touch force estimation unit 330 may, for example, store $\overline{C}^t$, $A_{t_x}$ and $\overline{I}_t$ in memory indexed by the touch event and by the specific time instance t during the touch interval. Touch force estimation unit 330, using a database of acoustic intensity levels that maps the acoustic intensity levels to a touching force upon touch surface 115, determines an initial estimate of touch force $F_{\overline{I}_t}$ based on the acoustic intensity vector $\overline{I}_t$. Touch force estimation unit 330 may also determine a change (e.g., rate of change) in capacitance values relative to time ($\Delta C^t_{x,y}/\Delta t$), and a change (e.g., rate of change) in deformation area $A_{t_x}$ for the touch relative to time ($\Delta A_t/\Delta t$), as described in further detail below with respect to the exemplary process of FIGS. 8A and 8B. Touch force estimation unit 330 may estimate a speed of the touch ($v_{touch}$) upon touch panel 105 as a function of the determined rate of change in deformation area, as described in further detail below with respect to FIGS. 8A and 8B:

$$v_{touch}=f(\Delta A_{t_x}/\Delta t) \quad \text{Eqn. (1)}$$

Touch force estimation unit 330 may estimate the touch force ($F_{touch}$) as a function of $F_{\overline{I}_t}$ and $v_{touch}$, as described in further detail below with respect to the exemplary process of FIGS. 8A and 8B:

$$F_{touch}=f(F_{\overline{I}_t}, v_{touch}) \quad \text{Eqn. (2)}$$

Alternatively, touch force estimation unit 330 may estimate the touch force ($F_{touch}$) as a function of $F_{\overline{I}_t}$, $v_{touch}$, and $\Delta C^t_{x,y}/\Delta t$, as described in further detail below with respect to the exemplary process of FIGS. 8A and 8B:

$$F_{touch}=f(F_{\overline{I}_t}, v_{touch}, \Delta C^t_{x,y}/\Delta t) \quad \text{Eqn. (3)}$$

Touch force estimation unit 330 may provide the touch force estimate $F_{touch}$ as an output value for the touch interval for a specific touch event. The output value may include one of at least three discrete force levels (e.g., low, mid, high), or may be a continuous force range from a minimum force to a maximum force.

In one implementation, capacitive sampling unit 300 may be implemented by circuitry for measuring a capacitance $C_{xy}$ at each time instance $t_x$ during the touch interval, in conjunction with processing unit 220 that receives and processes the capacitance values $C_{xy}$. Touch deformation area unit 330 may be implemented by processing unit 220 that processes the capacitance values $C_{xy}$ to determine a touch deformation area $A_t$ at time instance t associated with touch 140. Acoustic measurement unit 320 may be implemented by circuitry for measuring acoustic intensity levels at each acoustic sensor 125-1 through 125-n, in conjunction with processing unit 220 that receives and processes the acoustic intensity levels $\overline{I}_t$ to determine an initial estimate of touch force $F_{\overline{I}_t}$ based on the measured acoustic intensity levels.

Figure 5A:
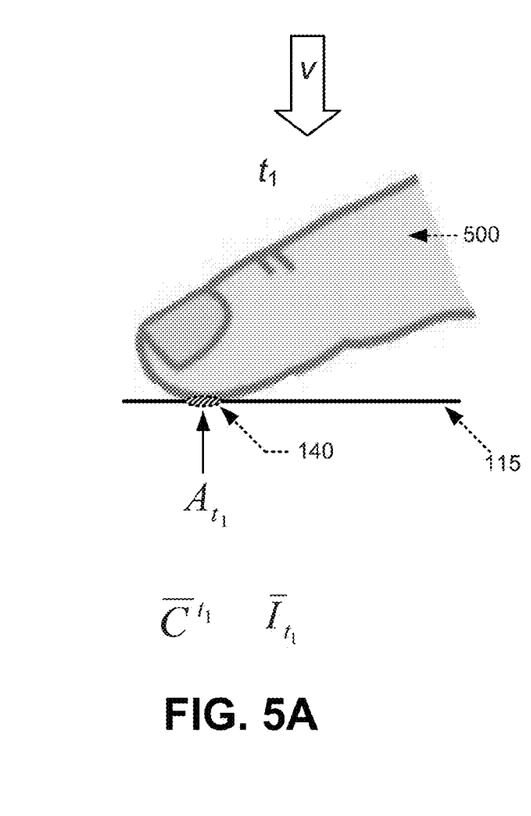
FIGS. 5A-5C depict an example of a time progression of a touch being applied by a finger to a touch surface of the device of FIG. 1A over a period of time that includes multiple time instances.
Figure 5B:
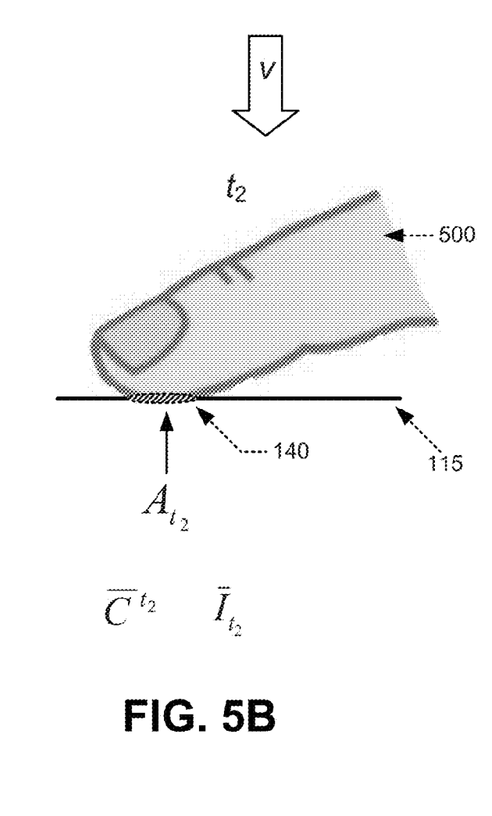
Figure 5C:
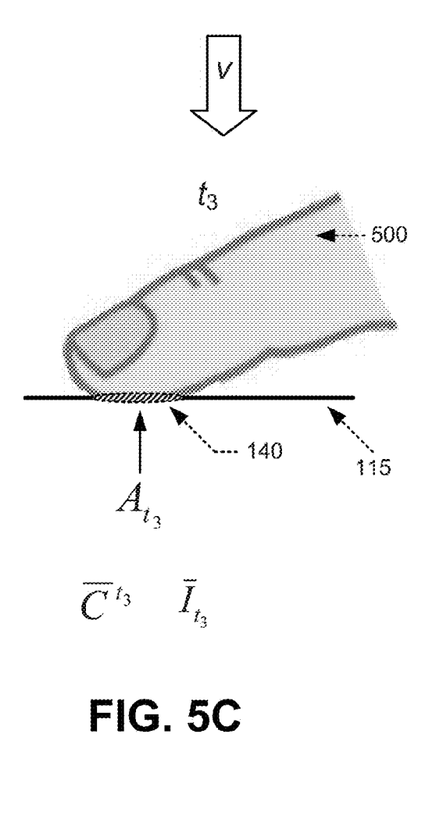

FIGS. 5A-5C depict an example of a time progression of touch 140 being applied by a finger 500 to touch surface 115 of device 100 over the touch interval that includes time instances $t_1$, $t_2$ and $t_3$. In FIG. 5A, at time instance $t_1$, the tip of finger 500, which is traveling with a speed v during touch 140, is barely touching touch surface 115 and has a corresponding small touch deformation area $A_{t_1}$. At time instance $t_2$, as further shown in FIG. 5B, the tip of finger 500 continues to deform during touch 140 upon touch surface 115 such that the corresponding touch deformation area $A_{t_2}$ has increased. At time instance $t_3$, as shown in FIG. 5C, the tip of finger 500 continues to deform an additional amount during touch 140 upon touch surface 115 such that the corresponding touch deformation $A_{t_3}$ has increased to reach a maximum deformation area associated with touch 140. As can be seen in FIGS. 5A, 5B and 5C, the progression of the deformation area as the tip of finger 500 touches touch surface 115 with a speed v is $A_{t_1} < A_{t_2} < A_{t_3}$. As further depicted in FIG. 5A, a capacitance vector $\overline{C}^{t_1}$ and acoustic intensity vector $\overline{I}_{t_1}$ is associated with touch deformation area $A_{t_1}$ at time $t_1$. As also depicted in FIGS. 5B and 5C, a capacitance vector $\overline{C}^{t_2}$ and acoustic intensity vector $\overline{I}_{t_2}$ is associated with touch deformation area $A_{t_2}$ at time $t_2$, and a capacitance vector $\overline{C}^{t_2}$ and acoustic intensity vector $\overline{I}_{t_2}$ is associated with touch deformation area $A_{t_2}$ at time $t_2$.

Figure 6:
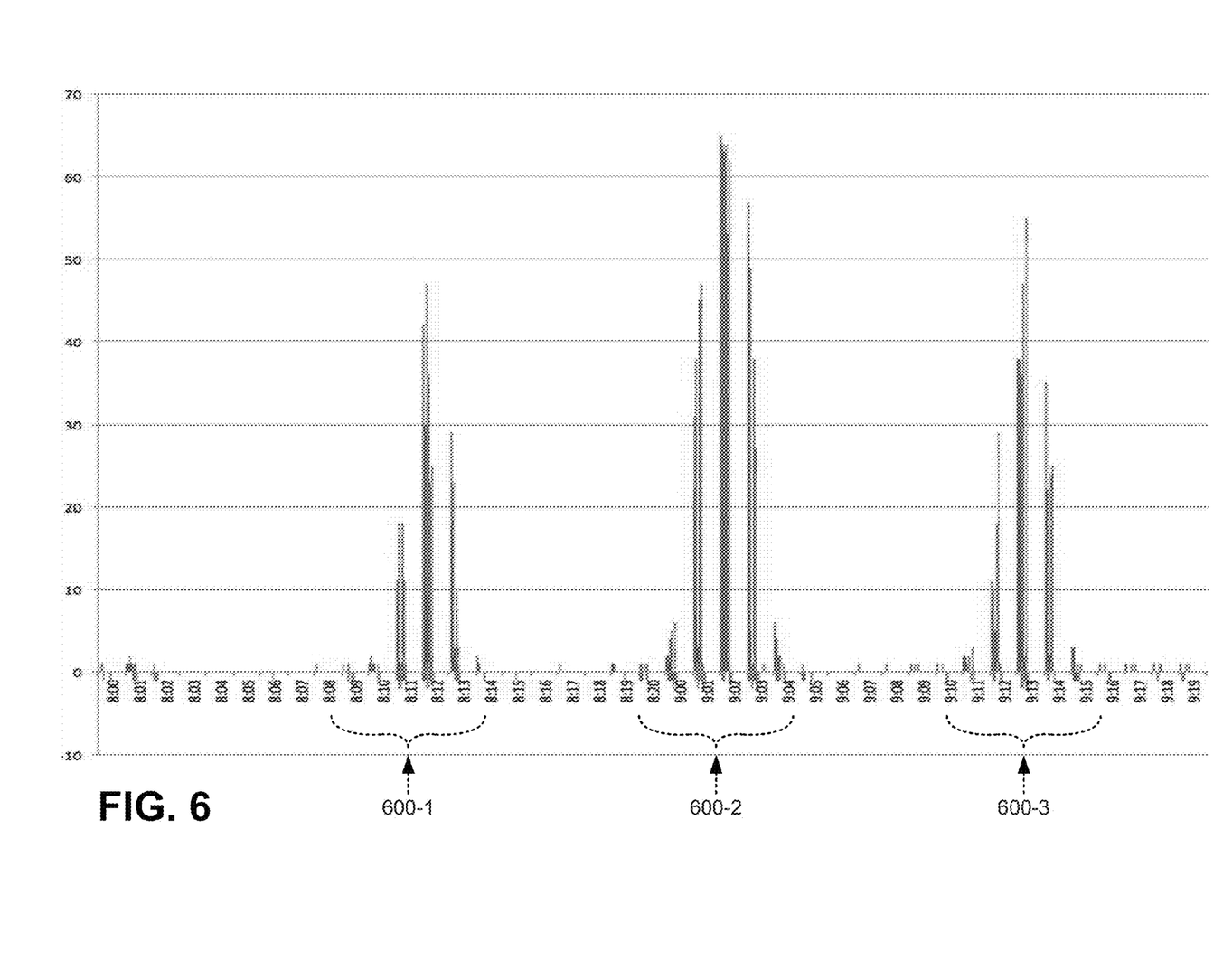
FIGS. 6 and 7 depict touches upon the touch panel of the device of FIG. 1A with respect to time, where the y axis includes the measured capacitance value and the x axis includes time.
Figure 7:
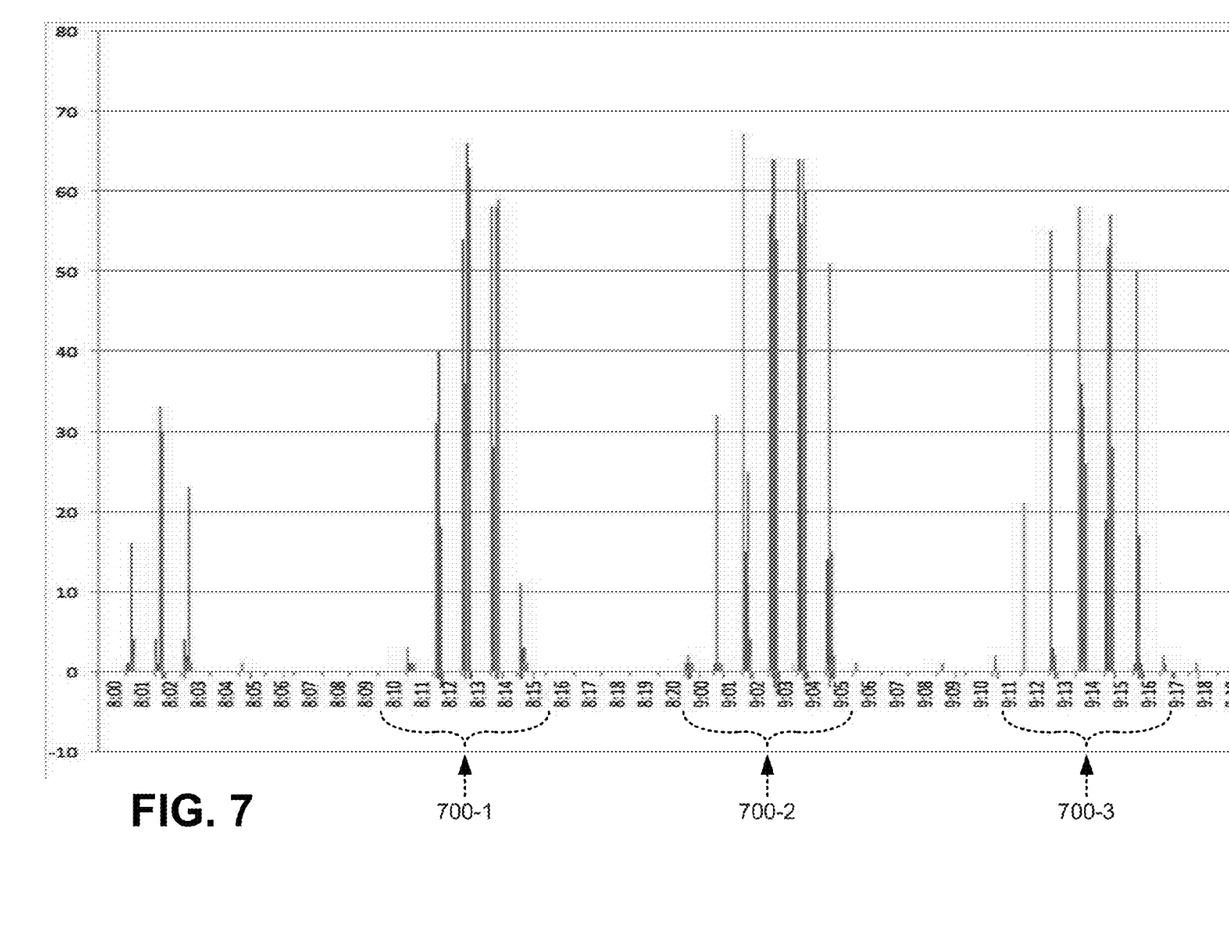

FIGS. 6 and 7 depict touches upon touch panel 105 with respect to time, where the vertical axis includes the measured capacitance value and the horizontal axis includes time (seconds:milliseconds). In FIG. 6, "soft" touches (i.e., relatively low force touches) upon touch panel 105 are measured, where each cluster 600-1, 600-2 and 600-3 includes capacitance measurements made at a single cell position x, y in the array of capacitive cells of layer 130 of touch panel 105 at multiple, successive time instances. For example, cluster 600-1 measures varying capacitance at a single cell position at time instances 8:08, 8:09, 8:10, 8:11, 8:12, 8:13 and 8:14. Clusters 600-2 and 600-3 each measure varying capacitance at different cell positions at different, successive time instances.

In FIG. 7, "forceful" touches (i.e., relatively high force touches) upon touch panel 105 are measured, where each cluster 700-1, 700-2 and 700-3 includes capacitance measurements made at one cell position x, y in the array of capacitive cells of layer 130 of touch panel 105 at multiple, successive time instances. For example, cluster 700-1 measures varying capacitance at a single cell position at time instances 8:10, 8:11, 8:12, 8:13, 8:14, and 8:15. Clusters 700-2 and 700-3 each measure varying capacitance at different cell positions at different, successive time instances. As is apparent viewing the plots of capacitances versus time of the "soft" touches of FIG. 6, and the "forceful" touches of FIG. 7, the capacitance values have slower rates of change in FIG. 6 relative to the rates of change of the capacitance values in FIG. 7. Therefore, the capacitance values associated with the "forceful" touches of FIG. 7 have higher, "tighter" spikes in capacitances relative to the slower changes in capacitances of FIG. 6. $\Delta A/\Delta t$ and $\Delta C/\Delta t$ for "forceful" touches will be greater than $\Delta A/\Delta t$ and $\Delta C/\Delta t$ for "soft" touches upon touch panel 105.

FIGS. 8A and 8B are flow diagrams illustrating an exemplary process for estimating a force of a touch upon a touch surface of a touch screen display based on corresponding acoustic intensity measurements and estimate touching speed of an object associated with the touch. The exemplary process of FIGS. 8A and 8B may be performed by components of electronic device 100, such as those components depicted in FIG. 3. The exemplary process of FIGS. 8A and 8B may be executed when a touch is initiated at time $t_x$ (where x=0) upon touch surface 115 of touch panel 105 of device 100. The exemplary process of FIGS. 8A and 8B may be triggered upon a touch occurring upon touch panel 105, and may execute over a touch interval comprising multiple time instances ($t_0$, $t_1$, $t_2$, $t_3$, ...) that may correspond, for example, to intervals of a digital clock of device 100. In other implementations, the exemplary process of FIGS. 8A and 8B may be executed at a recurring interval (e.g., at intervals of a digital clock), with the interval being of a short duration (e.g., milliseconds or microseconds).

The exemplary process may include acoustic measurement unit 320 determining a vector of acoustic intensity values $\overline{I}_{t_x}$ on acoustic measurements made by multiple touch panel acoustic sensors 125-1 through 125-n (block 805). Each acoustic sensor 125, at time $t_x$, measures an acoustic intensity (i.e., sound amplitude) at the respective location of the acoustic sensor, and supplies the measured acoustic intensity from touch panel 105 to acoustic measurement unit 320. Acoustic measurement unit 320 generates an n-dimensional acoustic intensity vector $\overline{I}_{t_x}$ for time $t_x$ that includes the full set of measured acoustic intensity values from acoustic sensors 125-1 through 125-n, and passes the vector $\overline{I}_{t_x}$ to touch force estimation unit 330.

Touch force estimation unit 330 may map the vector of acoustic intensity values $\overline{I}_{t_x}$ to an applied touch force level $$F_{I_{t_x}}$$

(block 810). A data structure may be stored in association with touch force estimation unit 330 (e.g., stored in memory 230, or storage device 250) that maps an n-dimensional array of acoustic intensity values ($\overline{I}_{t_x}$) to an initial estimate of an applied touch force $$F_{I_{t_x}}.$$

Capacitive sampling unit 300 may sample the capacitance $C^t_{x,y}$ at each cell position x, y in the capacitive cell matrix of layer 130 of touch panel 105 at time $t_x$ (block 815). Capacitive sampling unit 300 samples, at time $t_x$, the current capacitance value for every cell position x, y in the cell matrix of layer 130, where the capacitance value for each cell position x, y is related to the touch force applied to the cell position. For example, in some implementations, the greater the force of the touch upon the cell position x, y, the higher the capacitance value for that cell position.

Touch deformation area unit 310 may determine a touch deformation area ($A_{t_x}$), at time $t_x$, based on the sampled capacitive values, in the region of touch panel 105 associated with the touch (block 820). Touch deformation area unit 310 may determine that, out of the entire matrix of capacitive cells, one or more cells may have capacitance values in a region of touch position measuring layer 130 that indicate a touch in that region (e.g., exceed a threshold capacitance value). For example, the touch deformation area at time $t_x$ ($A_{t_x}$) can be defined by this region having capacitance values exceeding the threshold capacitance value. The size and location of the touch deformation area $A_{t_x}$ at time instance $t_x$ may be supplied to touch force estimation unit 330. Touch deformation area unit 310 supplies the size and location of touch deformation area $A_{t_x}$ to touch force estimation unit 330.

Touch force estimation unit 330 may determine a rate of change in the size of deformation area ($A_{t_x}$) for the touch relative to time ($\Delta A_{t_x}/\Delta t$) (block 825). For example, touch force estimation unit 330 may determine a rate of change in deformation area relative to the current time instance $t_x$, and one or more previous time instances (e.g., for time instances $t_x$ and $t_{x-1}$). As another example, touch force estimation unit 330 may determine, at time instance t, an instantaneous rate of change in touch deformation area with respect to time: $dA_t/dt$. Touch force estimation unit 330 may estimate a speed of touch ($v_{touch}$) as a function of the rate of change in the deformation area ($\Delta A_{t_x}/\Delta t$) (block 830): $v_{touch} = f(\Delta A_{t_x}/\Delta t)$. Based on mathematical models, and/or based on actual experimental measurements, the function (f) may be derived that equates the speed of touch ($v_{touch}$) with the rate of change in the deformation area ($\Delta A_{t_x}/\Delta t$).

Touch force estimation unit 330 may determine a rate of change in capacitance values relative to time ($\Delta C^t_{x,y}/\Delta t$) (block 835). For example, touch force estimation unit 330 may determine a rate of change in capacitance relative to the current time instance $t_x$, and one or more previous time instances. As another example, touch force estimation unit 330 may determine, at time instance $t_x$, an instantaneous rate of change in capacitance with respect to time for each cell position x, y: $d\ C_{x,y}^{t_x}/dt$.

A determination may be made if the touch interval is finished (block 840). The touch interval may finish when the touch input is removed. If the touch interval is not finished (NO—block 840), then the time instance may increment (x=x+1), and the exemplary process may return to block 805 (e.g., the next clock interval). If the touch interval has finished (YES—block 840), then touch force estimation unit 330 may estimate a touch force ($F_{touch}$) as a function of the initial touch force estimate $F_{I_t}$, and the estimated speed of touch ($v_{touch}$): $F_{touch}=f(F_{I_t}, v_{touch})$; or as a function of the initial touch force estimate $F_{I_t}$, the estimated speed of touch ($v_{touch}$), and the determined rate of change in capacitance values relative to time $\Delta C^t_{x,y}/\Delta t$: $F_t=f(F_{I_t}, v_{touch}, \Delta C_{x,y}^{t_x}/\Delta t)$ (block 850).

Touch force estimation unit 330 may estimate the touch force $F_{touch}$ based on the touch force level determined in block 810, the estimated speed of touch determined in block 830, and/or the rate of change in capacitance values determined in block 835. Various different functions may be used to determine $F_{touch}$ based on $F_{I_t}$, $v_{touch}$, and/or $\Delta C^t_{x,y}/\Delta t$. In one implementation, $F_{touch}$ may be determined based on a function that adds together fractional components of $F_{I_t}$, $v_{touch}$, and/or $\Delta C^t_{x,y}/\Delta t$. Other types of functions, however, may alternatively be used. The exemplary process of FIGS. 8A and 8B may be repeated at multiple time instances $t_x$, $t_{x+1}$, $t_{x+2}$, $t_{x+3}$, etc.) during the touch interval associated with touch 140 upon touch panel 105. Therefore, each touch 140 may be associated with a series of values for $I_{t_x}$, $A_{t_x}$, and $C_{x,y}^{t_x}$ at different time instances (x, x+1, x+2, ...) during the touch interval. The estimated touch force $F_{touch}$, from block 850, may be mapped into one of multiple discrete force levels (block 855). For example, the estimated touch force $F_{touch}$ may be mapped into one of three different discrete force levels of a low, a mid or a high touch force. Alternatively, the estimated touch force $F_{touch}$ may be output as a force having a continuous range (i.e., $F_{min}<F_{touch}<F_{max}$, where $F_{min}$ and $F_{max}$ are determined by the detection capability of touch panel 105).

The foregoing description of the embodiments described herein provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 8A and 8B, the order of the blocks may be varied in other implementations. Moreover, non-dependent blocks may be performed in parallel.

Certain features described herein may be implemented as "logic" or as a "unit" that performs one or more functions. This logic or unit may include hardware, such as one or more processors, microprocessors, application specific integrated circuits, or field programmable gate arrays, software, or a combination of hardware and software.

The term "comprises" or "comprising" as used herein, including the claims, specifies the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

What is claimed is:

1. A method, comprising:
    measuring, at multiple instances of time during a touch interval, capacitance values of a capacitive touch screen display associated with an area in contact with a finger touching the capacitive touch screen display;
    determining, at the multiple instances of time, a size of the area upon the capacitive touch screen display in contact with the finger touching the capacitive touch screen display;
    determining a rate of change in the size of the area in contact with the finger with respect to time;
    estimating a speed associated with the finger based on the determined rate of change in the size of the area;
    measuring, at the multiple instances of time during the touch interval, an acoustic intensity of the finger touching the capacitive touch screen display;
    determining an initial estimate of touch force based on the measured acoustic intensity; and
    estimating a touching force of the finger touching the capacitive touch screen display based on the estimated speed associated with the finger and the initial estimate of touch force.

2. The method of claim 1, wherein the size of the area upon the capacitive touch screen display varies with time as the finger deforms as the finger touches the touch screen display during the touch interval.

3. The method of claim 1, wherein determining the size of the area upon the capacitive touch screen display comprises:
    determining, at a first time instance, capacitances across an array of cells of the capacitive touch screen display and identifying first multiple cells of the array of cells having capacitances greater than a threshold capacitance value, wherein the first multiple cells comprise the area in contact with the finger at the first time instance.

4. The method of claim 3, wherein determining the size of the area upon the capacitive touch screen display comprises:
    determining, at a second time instance, capacitances across an array of cells of the capacitive touch screen display and identifying second multiple cells of the array of cells having capacitances greater than the threshold capacitance value, wherein the second multiple cells comprise the area in contact with the finger at the second time instance.

5. The method of claim 4, wherein determining the rate of change in the size of the area in contact with the finger with respect to time comprises:
    determining a rate of change between the area at the second time instance and the area at the first time instance with respect to time.

6. A device, comprising:
    a capacitive touch screen display;
    a capacitive sampling unit configured to measure, at the multiple instances of time during a touch interval, capacitance values of the capacitive touch screen display associated with an area in contact with an object touching the capacitive touch screen display;

a touch deformation area unit configured to determine, at the multiple instances of time, a size of the area upon the capacitive touch screen display in contact with the object touching the capacitive touch screen display;

acoustic sensors adjacent the display;

an acoustic measurement unit configured to measure, at the multiple instances of time during the touch interval, an acoustic intensity of the object touching the capacitive touch screen display;

a touch force estimation unit configured to:
determine a rate of change in the size of the area in contact with the object with respect to time;
determine an initial estimate of touch force based on the measured acoustic intensity; and
estimate a touching force of the object touching the capacitive touch screen display based on the determined rate of change of the size of the area with respect to time and the initial estimate of touch force.

7. The device of claim 6, wherein the device comprises one of a cellular radiotelephone, a satellite navigation device, a smart phone, a Personal Communications System (PCS) terminal, a personal digital assistant (PDA), a gaming device, a media player device, a tablet computer, a surface table, or a digital camera.

8. The device of claim 6, wherein the size of the area upon the capacitive touch screen display varies with time as the object deforms over time as the object touches the display.

9. The device of claim 6, wherein, when determining the size of the area upon the capacitive touch screen display, the touch force deformation area unit is further configured to:
determine, at a first time instance, capacitances across an array of cells of the capacitive touch screen display and identifying first multiple cells of the array of cells having capacitances greater than a threshold capacitance value, wherein the first multiple cells comprise the area in contact with the deformable pointing object at the first time instance.

10. The device of claim 9, wherein, when determining the size of the area upon the capacitive touch screen display, the touch force deformation area unit is further configured to:
determine, at a second time instance, capacitances across the array of cells of the capacitive touch screen display and identifying second multiple cells of the array of cells having capacitances greater than the threshold capacitance value, wherein the second multiple cells comprise the area in contact with the deformable pointing object at the second time instance.

11. The device of claim 10, wherein, when determining the rate of change in the size of the area in contact with the object with respect to time, the touch force estimation unit is further configured to:
determine a rate of change between the area at the second time instance and the area at the first time instance with respect to time.

* * * * *